United States Patent [19]

Bryant et al.

[11] Patent Number: 5,034,860
[45] Date of Patent: Jul. 23, 1991

[54] MANUALLY ACTUATED VEHICLE SPOTLIGHT

[75] Inventors: Geoffrey A. Bryant, Livonia; Gregory L. Griner, Monroe, both of Mich.

[73] Assignee: Ford Motor Company, Dearborn, Mich.

[21] Appl. No.: 591,329

[22] Filed: Oct. 1, 1990

[51] Int. Cl.⁵ ............................................. B60Q 1/08
[52] U.S. Cl. ...................................... 362/70; 362/66; 362/269; 362/275
[58] Field of Search ................... 362/66, 70, 269, 271, 362/275, 287, 371, 35

[56] References Cited

U.S. PATENT DOCUMENTS

| | | |
|---|---|---|
| 1,491,937 | 4/1924 | Walker . |
| 1,631,003 | 5/1927 | Bradshaw . |
| 2,135,263 | 11/1938 | Sisson . |
| 2,410,365 | 10/1946 | Sauer . |
| 2,639,367 | 5/1953 | Chiuzzi . |
| 2,918,566 | 12/1959 | Lunsford . |
| 2,961,834 | 11/1960 | Getz . |
| 3,229,945 | 1/1966 | Hartman . |
| 4,212,050 | 7/1980 | Trenkler . |
| 4,419,721 | 12/1983 | Gregoire et al. . |
| 4,633,375 | 12/1986 | Tres . |
| 4,692,845 | 9/1987 | Widhalm et al. . |
| 4,707,014 | 11/1987 | Rich . |
| 4,722,030 | 1/1988 | Bowden . |
| 4,787,665 | 11/1988 | Rich . |

Primary Examiner—Carroll B. Dority
Attorney, Agent, or Firm—Daniel M. Stock; Roger L. May

[57] ABSTRACT

An improved vehicle spotlight is mounted on the roof of a vehicle and is rotatively and pivotally adjustable by operation of a handle mounted within the vehicle passenger compartment. A slip ring connection is provided for access to the vehicle power supply in order to provide unlimited rotational freedom.

14 Claims, 4 Drawing Sheets

MANUALLY ACTUATED VEHICLE SPOTLIGHT

BACKGROUND OF THE INVENTION

1. Field of the Invention

The present invention relates generally to a retractable spotlights for motor vehicles and more specifically to such spotlights which are retractable from an operative position to a stowed position and which are rotatable about a vertical axis.

2. Description of the Related Art

In the manufacture and accessorization of emergency vehicles, such as police and fire vehicles, and certain service vehicles such as taxi cabs, it is often desirable to provide a spotlight for selectively illuminating objects not in the path of a standard vehicle headlight system. The most common scheme for providing flexibility in aiming such spotlights is achieved through shaft mounting a spotlight through the forward corner or A-pillar of the vehicle with access by a handle to the driver's seated position. Modern vehicle designs with their attention to minimizing vehicle weight and enhancing vehicle aerodynamics have specified A-pillar constructions which provide insufficient space for readily mounting such a structure. It is accordingly desirable that a searchlight design be provided which permits mounting a searchlight for flexible aiming in a vehicle position consistent with the vehicle's styling and design goals at a location other than the A-pillar.

It has been proposed to retractably mount a searchlight on the hood of a vehicle for actuation through an electric motor drive system. U.S. Pat. No. 4,212,050 to Trenkler is exemplary of such an approach. This approach fails to duplicate the fine manual control afforded by the earlier A-pillar mounted system and furthermore adds complication expense to provide the aiming function in its specification of the use of an electric drive motor.

It is also known to retractably mount lights on vehicle roofs to facilitate movement between a raised operative position and a lowered stowed position. U.S. Pat. No. 4,692,845 to Widhalm et al. illustrates such a mounting arrangement in which manual selection of lamp position from outside the vehicle is facilitated. This, of course, is an impractical control approach for use in emergency vehicles and is not an effective substitute for the previously available A-pillar spotlight systems.

U.S. Pat. No. 4,707,014 and U.S. Pat. No. 4,787,665, both to Rich, illustrate a motor driven arrangement for retracting lamps placed in a roof mounted spoiler. They, too, offer limited adjustment flexibility without manual control from the vehicle interior and undesirably necessitate the use of some motor driving system.

It is also known to provide a roof mounted spotlight that is both aimable in tipping relationship about a horizontal axis and rotatable about a vertical axis from U.S. Pat. No. 1,491,937 to Walker. Walker, however, provides no teaching of the manner in which this adjustment capability can be provided with movement between operative and stowed positions with respect to the vehicle roof. It also is lacking teaching on the transmittal of electrical power to the spotlight from the interior of the vehicle, suggesting nothing other than the provision of external wiring that necessarily limits the extent of its rotative movement about a vertical axis.

SUMMARY OF THE INVENTION

Responsive to the deficiencies in the prior art, it is an object of the present invention to provide a spotlight for mounting on the roof of a vehicle that is actuated by operation of a handle mounted interiorly of the vehicle to pivot between a raised operative position and a lowered stowed position, the lamp being mounted for free rotative movement with respect to the vehicle roof.

It is a further object of the present invention to provide such a spotlight in which the conducting of electrical current between relatively movable portions of the spotlight is effected through electrical conduits carried integrally with the relatively movable portions.

According to a feature of the present invention, a spotlight is provided which includes a lamp mounted for pivotal and rotational movement with respect to the vehicle roof and including a portion extending through an aperture formed through the roof and a handle mounted interior the vehicle in pivotal relationship with the lamp to effect movement between the raised operative and lower stowed positions by movement of the handle between a position generally perpendicular to the roof to a position generally parallel to the roof.

According to another feature of the present invention, the handle is also drivingly engaged for effecting rotative movement of the lamp with respect to the vehicle roof.

According to yet another feature of the present invention, a slip ring connection is provided between the vehicle roof and the lamp to permit the transmit the transmittal of electrical current therebetween without utilization of motion limiting wiring structure.

BRIEF DESCRIPTION OF THE DRAWINGS

These and other objects and features will become apparent to those skilled in the automotive vehicle body arts upon reading the following description with reference to the accompanying drawings in which.

DESCRIPTIONS OF THE PREFERRED EMBODIMENTS

Figure 1:
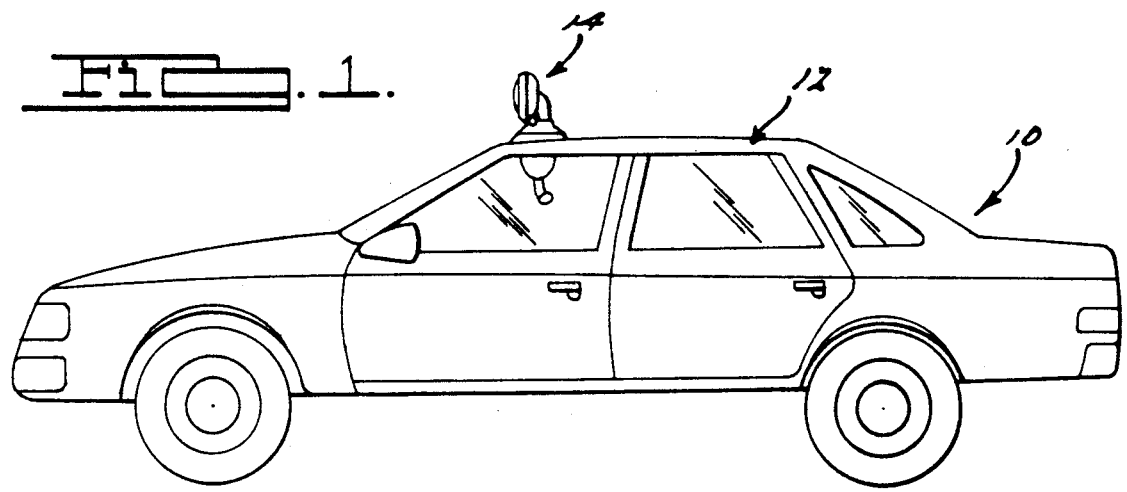
FIG. 1 is a side view of an automobile having mounted thereon a spotlight according to the present invention.

Turning now to the drawings, and in particular to FIG. 1 thereof, an automotive vehicle 10 having a roof 12 is illustrated as including a spotlight assembly 14 mounted on the roof.

Figure 2:
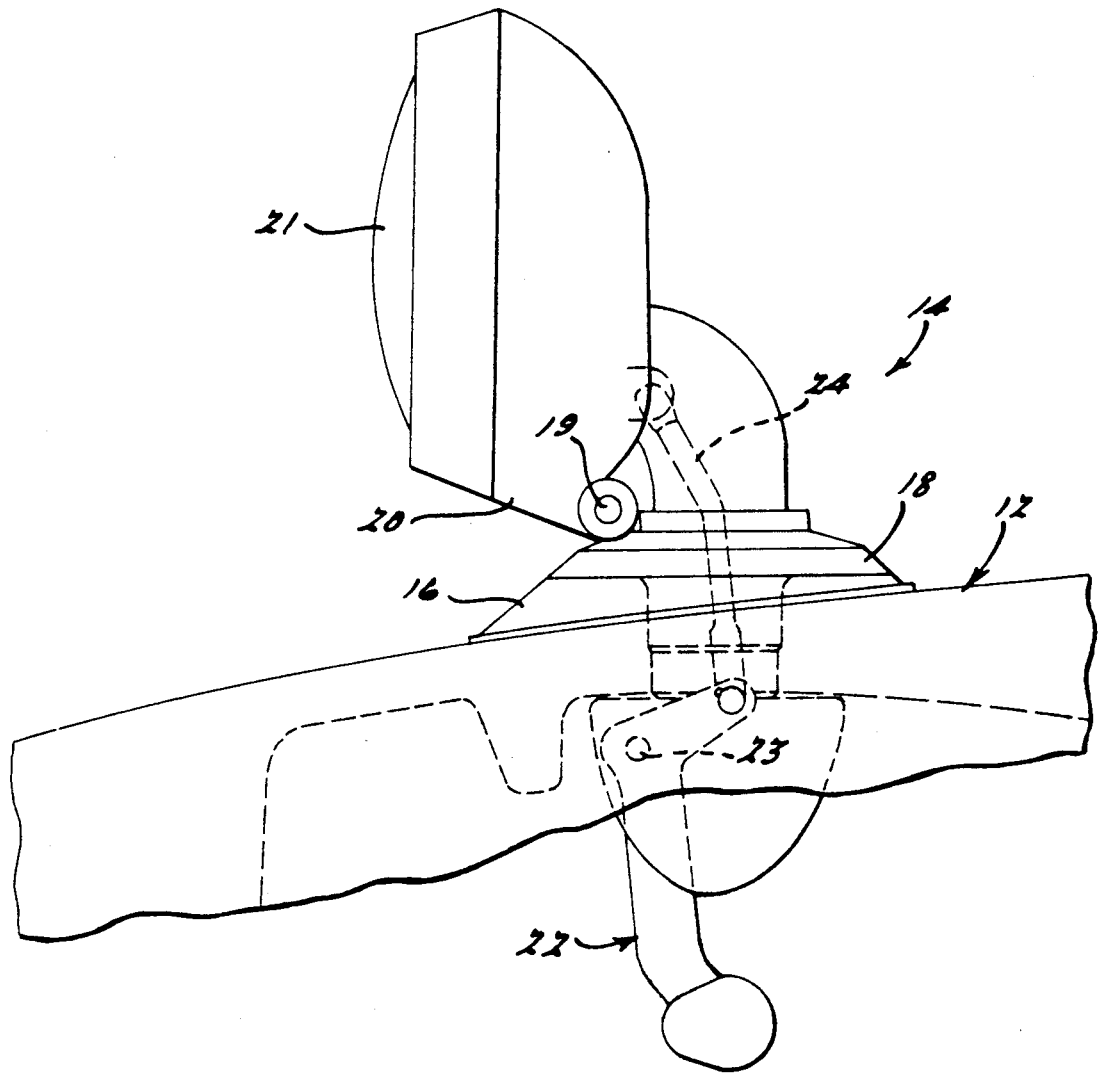
FIG. 2 is an enlarged side view, simplified for purposes of illustration, of the spotlight of the present invention in its raised operative position.
Figure 3:
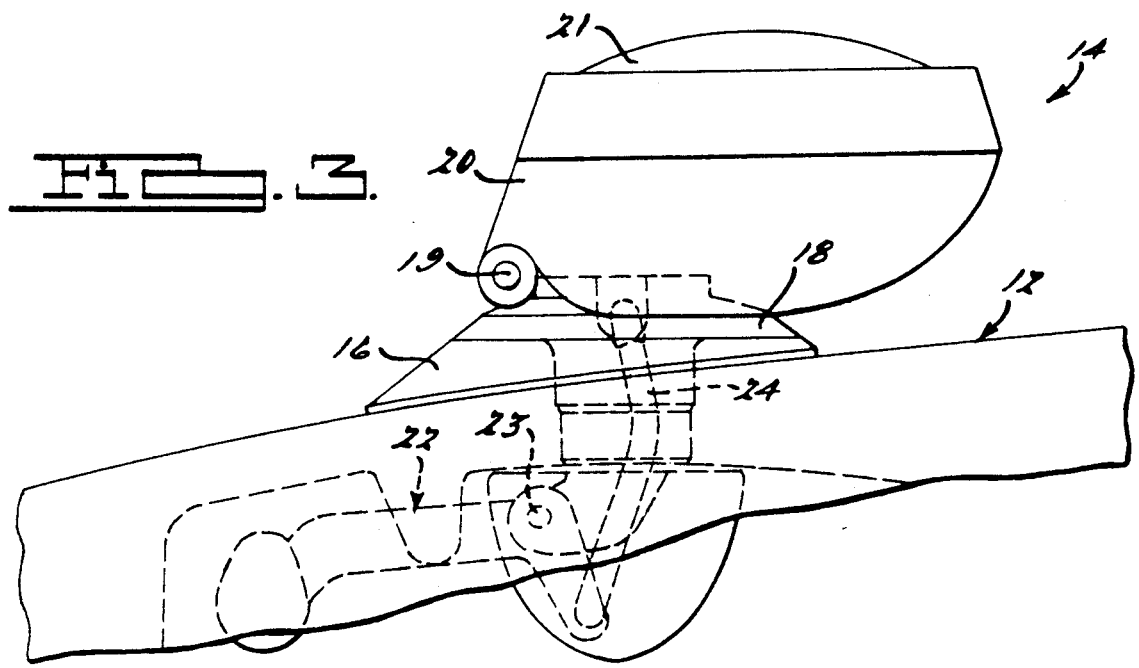
FIG. 3 is a view similar to FIG. 2 showing the spotlight in its lower retracted position.
Figure 4:
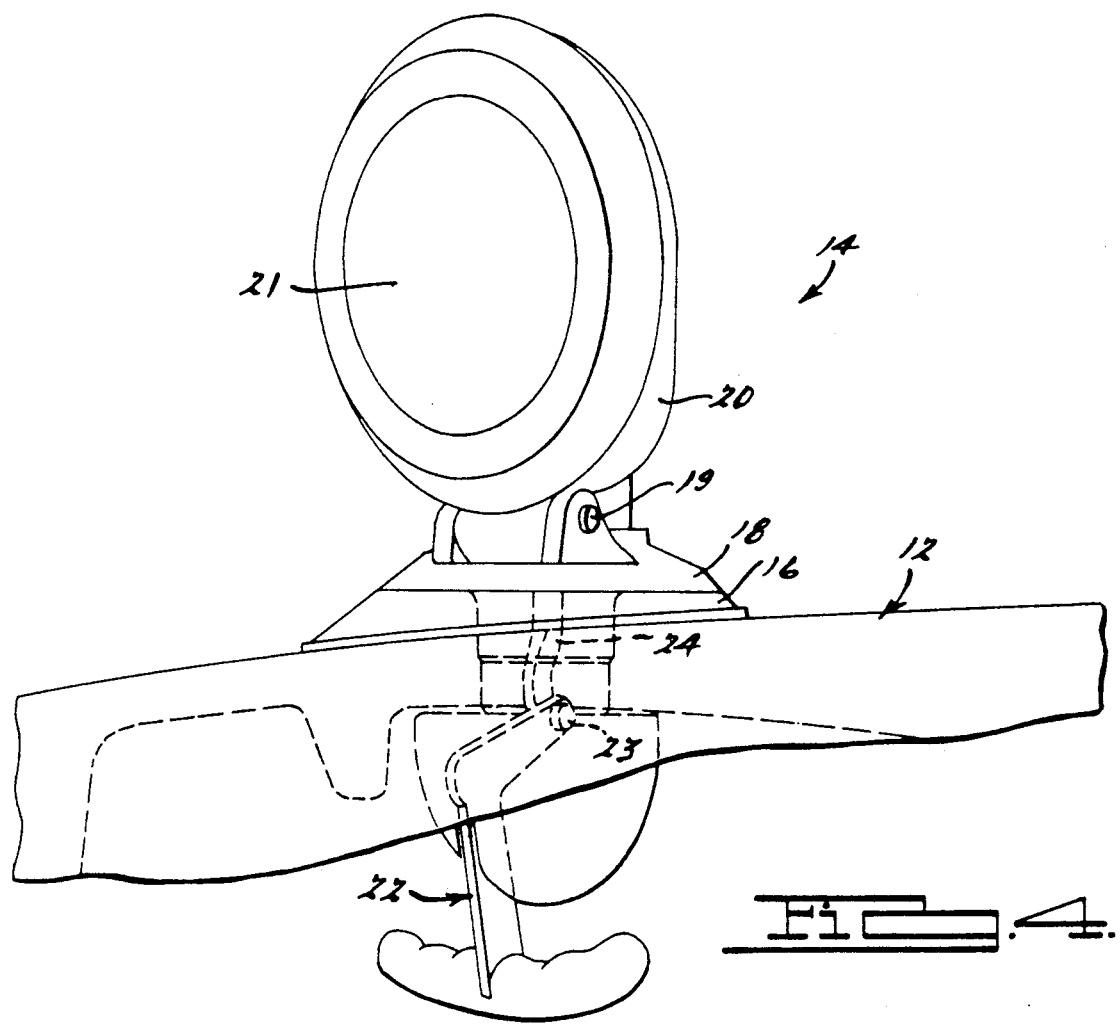
FIG. 4 is a view similar to FIGS. 2 and 3 showing the spotlight rotated about the generally vertical axis.

The operative adjusting modes of the spotlight assembly 14 can be readily seen by reference to FIGS. 2, 3 and 4. In these figures, the spotlight assembly 14 is illustrated as comprising a base housing 16 fixedly secured on the roof 12, a lamp mounting plate 18 mounted for rotation on the base housing 16 about a substantially vertical axis, a lamp housing 20 pivotally mounted on the lamp mounting plate, a handle 22 pivotally mounted on a lower portion of the lamp mounting plate on the interior of the vehicle 10 and a linkage 24 operatively interconnecting the lamp housing 20 and the handle 22.

In both FIGS. 1 and 2, the lamp housing 20 is illustrated in an operative position position in which its lamp 21 is aimed forwardly of the vehicle in a horizontal direction generally parallel to the longitudinal vertical plane of the vehicle 10. Pivotal movement of the handle 22 about its pivotal mounting axis indicated generally at 23 effects pivoting movement of the lamp housing 20 about its pivotal axis 19 and movement of the handle from the substantially vertical position of FIG. 2 to the substantially horizontal position of FIG. 3 generally parallel to the roof 12 effects movement of the lamp housing from the vertical position of FIG. 2 to the substantially horizontal stowed position of FIG. 3 generally parallel to and in closed proximity with the roof 12. The generally L-shaped bell crank formation of the handle 22 is proportioned to effect the desired balanced response of pivotal movement.

Since the handle 22 is pivotally mounted about the axis 23 to the lamp mounting plate 18, rotational movement of the handle 22 rotatatively drives the handle mounting plate 18 and hence the lamp housing 20 between desired rotative positions, such as the rotated position shown in FIG. 4.

Figure 5:
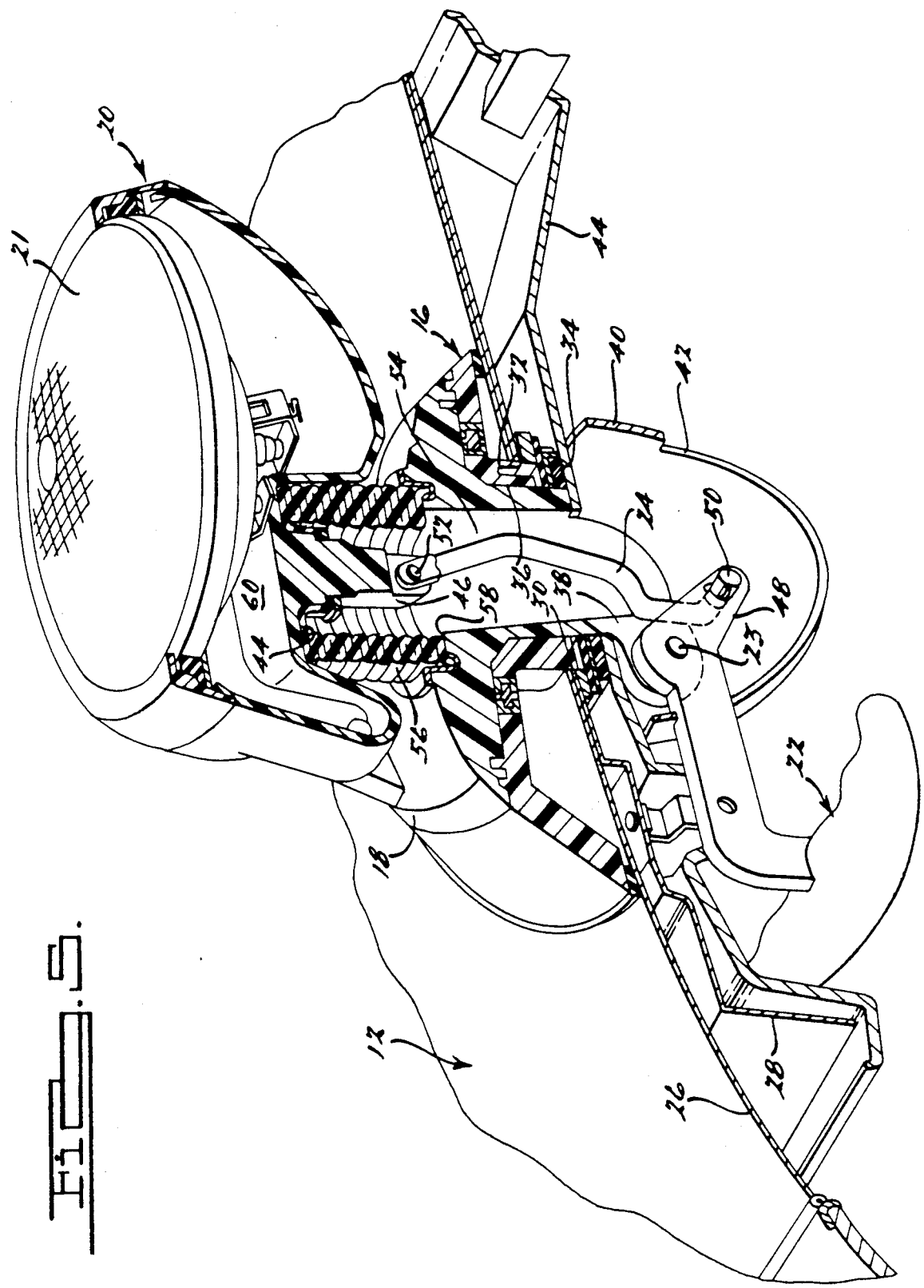
FIG. 5 is an enlarged perspective and partially cross-sectioned view of the spotlight of the present invention illustrating in more detail the mechanical interrelationship of its parts, most electrical interconnections between the components being removed for clarity.

Turning next to FIG. 5, a more detailed showing of the mechanical elements of the spotlight assembly 14 of the present invention is provided. The roof 12 is illustrated as comprising an outer panel 26 and an inner panel 28 which are pierced by an aperture 30. The base housing 16 is illustrated as comprising a truncated conical structure having a central depending hub 32 which is received in the aperture 30 to retain the cover 16 with respect to the roof 12. A locking cover 34 is provided to fixedly secure the spotlight assembly 14 with respect to the roof 12 and to cover the aperture 30. The hub 32 includes an inner diameter 36 on which the lamp mounting plate 18 is rotatively mounted. In the more detailed view of FIG. 5, it can also be seen that the lamp mounting plate 18 includes a lower portion 38 on which the handle 22 is mounted for pivotal movement about the axis 23. A rounded trim cover 40 having a slot 42 lying along the path of pivotal movement of the handle 22 is fixedly secured to an inner trim panel 44 secured to the roof 12 in a known manner.

The lamp housing 20 is preferably formed as a plastic article and includes a depression 44 defining a pocket from which projects a mounting pillar 46. The linkage 24 is pivotally connected at its lower end for movement with respect to an operating arm 48 of the handle 22 about a pivotal axis 50 and its upper end to the mounting pillar 46 for pivotal movement with respect to an axis 52. The linkage 24 extends through an inner bore 54 of the lamp mounting plate 18 and a fluid impermeable flexible boot 56 is fixedly secured at one end to an upper surface 58 of the lamp housing 18 and at its opposite end to an annular surface 60 of the depression 44. Provision of this boot 56 seals the interior of the vehicle from the atmosphere by preventing communication with the inward opening bore 54.

Figure 6:
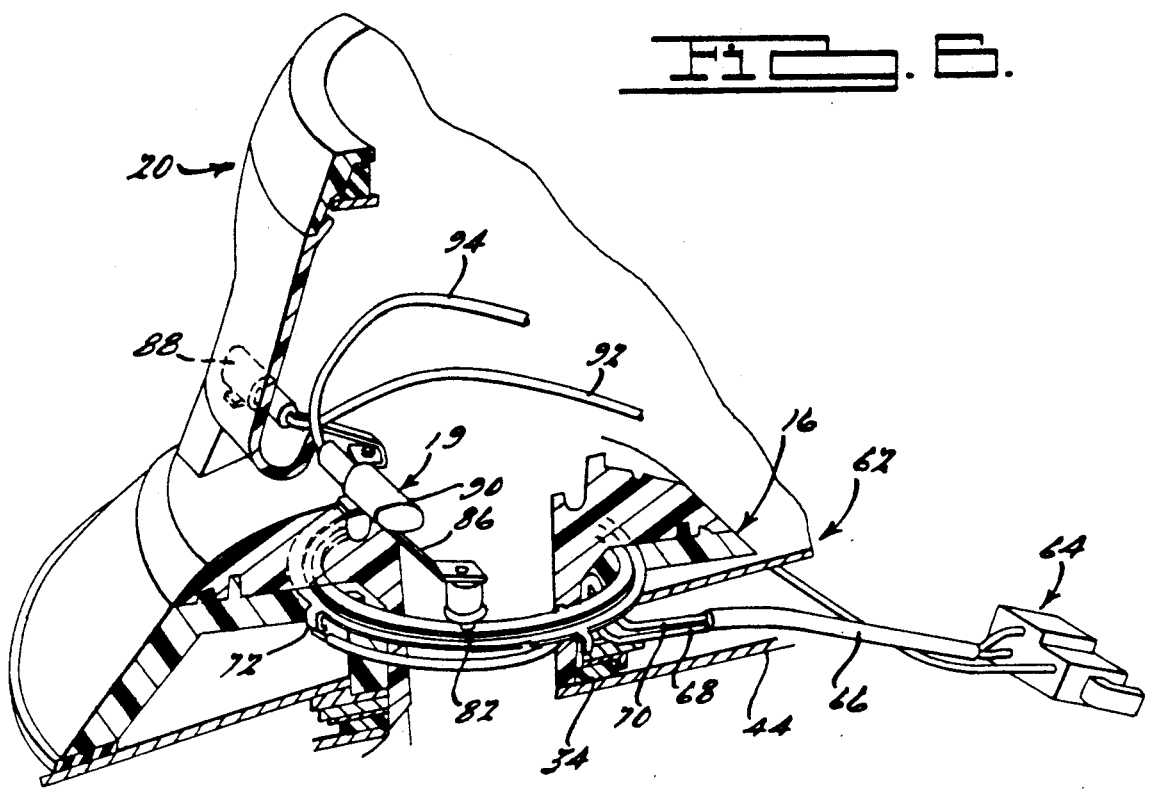
FIG. 6 is an enlarged partially cross-sectioned view of the spotlight of the present invention showing the electrical interconnections of the spotlight in installed positions.
Figure 7:
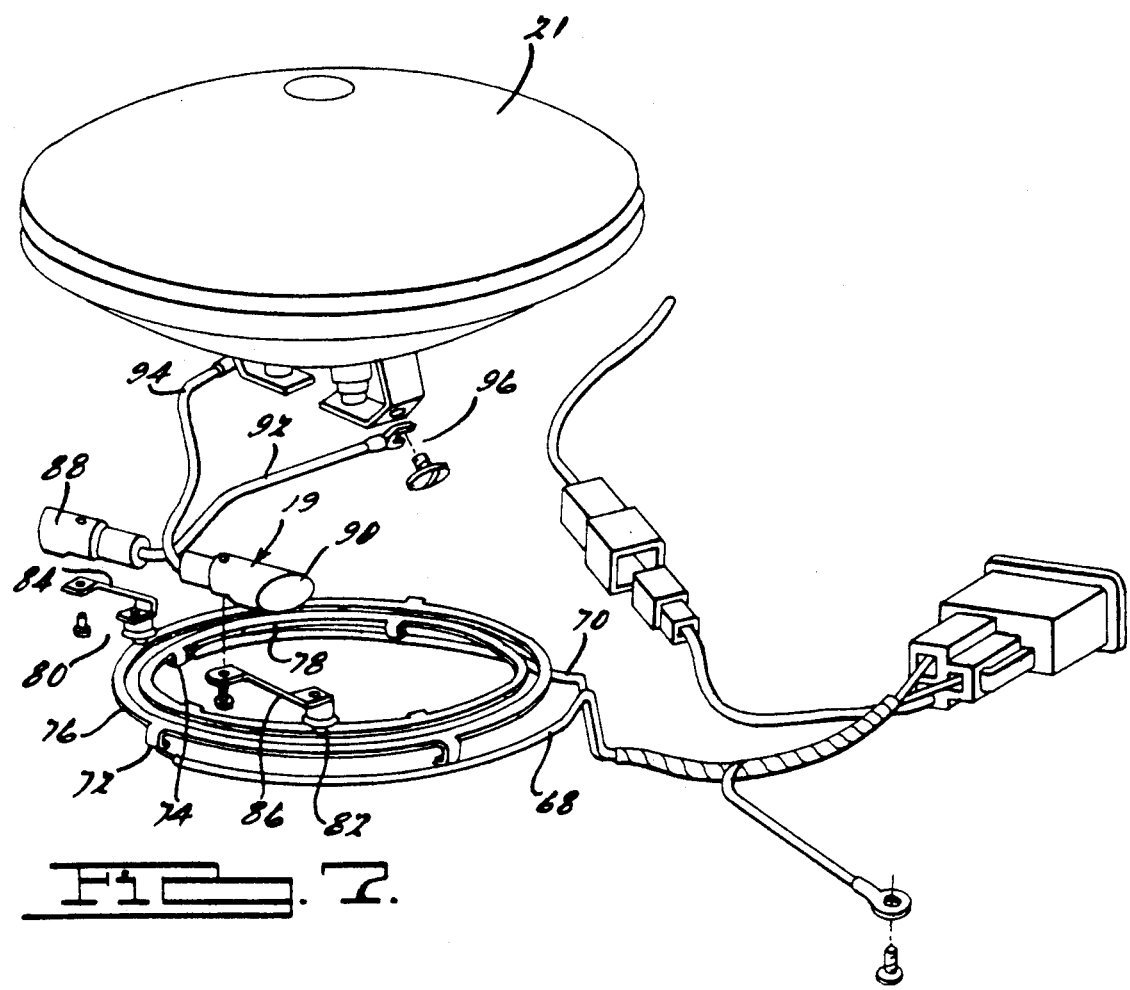
FIG. 7 shows an exploded view of the electrical interconnections.

Turning now to FIGS. 6 and 7, the preferred embodiment of the present invention for providing electrical power to the lamp 21 from a source of electrical power, not shown, is illustrated in detail. According to the preferred embodiment, a power distribution system indicated generally at 62 includes a switch assembly 64 from which an electrical conduit 66 extends having a pair of leads 68, 70 in communication through the switch 64 to a source of DC power (not shown). The leads 68, 70, as may best be seen in FIG. 7, connect at conductor tangs 72, 74, respectively, carried on outer and inner slip rings 76, 78, respectively, to a pair of contacts 80, 82, respectively. The contacts 80, 82 are cantilever mounted through arms 84, 86, respectively, to a pair of pivot pushings 88, 90, from which leads 92, 94 extend to effect fixed electrical connections, as indicated at 96, with the lamp 21. The bushings 88, 90 are rotatably mounted with respect to the lamp housing 20 to define its pivot axis 19. The inner and outer slip rings 78, 76, respectively are mounted in the stationary base housing 16, while the contacts 80, 82 are mounted for rotation with the lamp mounting plate 18 since the bushings 88, 90 define the pivotal axis 19 for effecting interconnection between the lamp mounting plate 18 and the lamp housing 20. It can therefore be readily seen that the lamp 21 can be operated from the switch 64 without regard to the pivotal or rotational positioning of lamp housing 20.

While only one embodiment of the invention spotlight assembly has been here disclosed, others may be possible without departing from the scope of the appended claims.

We claim:

1. A spotlight adapted to be mounted on the roof of a vehicle and movable between a raised operative position and a lowered stowed position and rotatively movable about a generally vertical axis, the spotlight comprising:
    a base housing fixedly mounted on said roof in surrounding relationship about an aperture formed through said roof;
    a lamp mounting plate rotatively mounted on said base housing and having a lower portion extending interiorly of the vehicle below said roof;
    a lamp housing pivotally mounted on said lamp mounting plate;
    a handle pivotally mounted on said mounting plate lower portion for movement between a first position generally parallel to said roof and a second position generally perpendicular to said roof; and
    linkage means operatively engaged between said handle and said lamp housing to effect movement of said lamp housing between said spotlight stowed position and said spotlight operative position upon movement of said handle from said first to said second position.

2. A spotlight as defined in claim 1, wherein said handle comprises a bell crank.

3. A spotlight as defined in claim 1, wherein said linkage means comprises a link pivotally connected at one end of said lamp housing and at the other end to said handle.

4. A spotlight as defined in claim 2, wherein said linkage means comprises a link pivotally connected at one end of said lamp housing and at the other end to said handle.

5. A spotlight as defined in claim 1, and further comprising a fluid impermeable hollow elongated flexible boot member sealingly engaging said lamp housing and said lamp mounting plate.

6. A spotlight as defined in claim 1 wherein said linkage is carried within said boot member.

7. A spotlight as defined in claim 1, and further comprising a slip ring connection disposed between said base housing and said lamp mounting plate and operable to effect transmittal of electrical current therebetween.

8. A spotlight as defined in claim 7, and further comprising stationary electrical conduit means electrically interconnecting said slip ring and said lamp housing.

9. A spotlight as defined in claim 7 and further comprising stationary pivot member operatively disposed between said lamp housing and said lamp mounting plate and wherein said stationary electrical conduit means is fixedly secured on said fixed pivotal mounting member.

10. A spotlight adapted to be mounted on the roof of a vehicle having a source of electrical power therein and rotatively movable about a generally vertical axis, the spotlight comprising:
   a base housing fixedly mounted on said roof in surrounding relationship about an aperture formed through said roof;
   a lamp mounting plate rotatively mounted on said base housing and having a lower portion extending interiorly of the vehicle below said roof; and
   a lamp housing mounted on said lamp mounting plate;
   a slip ring connection disposed between said base housing and said lamp mounting plate and operable to effect transmittal of electrical current therebetween.

11. A spotlight as defined in claim 10, and further comprising stationary electrical conduit means electrically interconnecting said slip ring and said lamp housing.

12. A spotlight as defined in claim 11 and further comprising stationary pivot members operatively disposed between said lamp housing and said lamp mounting plate and pivotally mounting said lamp housing on said lamp housing and wherein said stationary electrical conduit means is fixedly secured on said fixed pivot members.

13. A spotlight as defined in claim 10 wherein said slip ring connection comprises a pair of rings fixedly mounted in said base housing and electrically connected to said power source and a pair of contacts carried for rotation with said lamp mounting plate.

14. A spotlight as defined in claim 13, and further comprising a fluid impermeable flexible boot member sealingly engaging said lamp housing and said lamp mounting plate.

* * * * *